United States Patent
Yoshimura

(10) Patent No.: US 8,863,142 B2
(45) Date of Patent: Oct. 14, 2014

(54) IMAGE FORMING APPARATUS

(75) Inventor: Sohichi Yoshimura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 194 days.

(21) Appl. No.: 13/402,095

(22) Filed: Feb. 22, 2012

(65) Prior Publication Data

US 2012/0222036 A1 Aug. 30, 2012

(30) Foreign Application Priority Data

Feb. 28, 2011 (JP) ................................ 2011-041535

(51) Int. Cl.
*G06F 9/46* (2006.01)
*G06F 15/173* (2006.01)
*G06F 3/12* (2006.01)

(52) U.S. Cl.
USPC ........... 718/104; 718/105; 709/223; 709/224; 709/225; 709/226; 358/1.1

(58) Field of Classification Search
None
See application file for complete search history.

(56) References Cited

U.S. PATENT DOCUMENTS

| | | | |
|---|---|---|---|
| 5,848,411 A | 12/1998 | Yamagishi | |
| 6,085,218 A * | 7/2000 | Carmon | 718/107 |
| 6,263,361 B1 | 7/2001 | Hoyer et al. | |
| 7,610,414 B2 * | 10/2009 | Kobashi et al. | 710/38 |
| 7,739,383 B1 * | 6/2010 | Short et al. | 709/226 |
| 7,917,905 B2 | 3/2011 | Itoh | |
| 8,516,121 B1 * | 8/2013 | Telang et al. | 709/226 |
| 2005/0198635 A1 * | 9/2005 | Olszewski et al. | 718/100 |
| 2006/0143291 A1 * | 6/2006 | Hayamatsu | 709/224 |
| 2007/0011661 A1 * | 1/2007 | Itoh | 717/127 |
| 2007/0071529 A1 * | 3/2007 | Lee et al. | 399/400 |
| 2007/0094357 A1 * | 4/2007 | Sugitani et al. | 709/219 |
| 2007/0121161 A1 * | 5/2007 | Yamada | 358/1.16 |
| 2007/0285709 A1 | 12/2007 | Yamasaki et al. | |
| 2008/0183871 A1 * | 7/2008 | Ogawa | 709/226 |
| 2009/0133018 A1 * | 5/2009 | Kaneki | 718/1 |
| 2009/0180144 A1 * | 7/2009 | Ito | 358/1.16 |
| 2010/0017805 A1 * | 1/2010 | Yamada | 718/102 |
| 2010/0064288 A1 * | 3/2010 | Yuki | 718/102 |
| 2010/0198987 A1 * | 8/2010 | Hinata et al. | 709/244 |
| 2010/0325339 A1 * | 12/2010 | Ogawa et al. | 711/103 |
| 2011/0019234 A1 * | 1/2011 | Nakamura | 358/1.15 |
| 2011/0051191 A1 * | 3/2011 | Sahara | 358/1.15 |
| 2013/0227585 A1 * | 8/2013 | Ichikawa et al. | 718/104 |

FOREIGN PATENT DOCUMENTS

| | | |
|---|---|---|
| CN | 100553279 C | 10/2009 |
| JP | 08-241214 | 9/1996 |
| JP | 09-069054 | 3/1997 |
| JP | 2003-044249 A | 2/2003 |

(Continued)

*Primary Examiner* — Adam Lee
(74) *Attorney, Agent, or Firm* — Renner, Otto, Boisselle & Sklar, LLP

(57) ABSTRACT

An MFP is provided with a main CPU for controlling operation of the MFP according an operating condition set to the MFP, a job management table for sequentially registering input jobs by priority, and a job execution control portion for determining whether or not to permit execution of the job according to the order of registration from a job with high priority that is registered in the job management table. The job execution control portion calculates, based on a job condition of a job intended for permission determination, utilization of the CPU associated with execution of the job, then restricts an operating condition of the MFP in a case where the calculated CPU utilization exceeds a predetermined value, and permits execution of the job according to the restricted operating condition in a case where the CPU utilization when the operating condition is restricted becomes the predetermined value or lower.

5 Claims, 12 Drawing Sheets

| JOB PRIORITY TABLE | | CPU UTILIZATION TABLE BY JOB | |
|---|---|---|---|
| 1 COPY | | A4/COLOR COPY | 20% |
| 2 SCAN TRANSMISSION | | A3/COLOR COPY | 15% |
| 3 FAX TRANSMISSION | | A4/BLACK-AND-WHITE COPY | 15% |
| 4 DOCUMENT TRANSMISSION | | : | |
| : | | A3/FAX TRANSMISSION | 8% |
| 8 FAX RECEPTION | | A4/PRINT | 30% |
| 9 PRINT | | A4/SCAN TRANSMISSION | 50% |
| 10 --- | | : | |

(56) References Cited

FOREIGN PATENT DOCUMENTS

| | | |
|---|---|---|
| JP | 2007-164481 | 6/2007 |
| JP | 2007-188226 | 7/2007 |
| JP | 2009-020752 | 1/2009 |
| JP | 4367856 B | 9/2009 |

* cited by examiner

JOB PRIORITY TABLE

1 COPY
2 SCAN TRANSMISSION
3 FAX TRANSMISSION
4 DOCUMENT TRANSMISSION
⋮
8 FAX RECEPTION
9 PRINT
10 ---
⋮

107

CPU UTILIZATION TABLE BY JOB

| | |
|---|---|
| A4/COLOR COPY | 20% |
| A3/COLOR COPY | 15% |
| A4/BLACK-AND-WHITE COPY | 15% |
| ⋮ | |
| A3/FAX TRANSMISSION | 8% |
| A4/PRINT | 30% |
| A4/SCAN TRANSMISSION | 50% |
| ⋮ | |

IMAGE FORMING APPARATUS

CROSS-NOTING PARAGRAPH

This non-provisional application claims priority under 35 U.S.C. §119(a) on Patent Application No. 2011-041535 filed in JAPAN on Feb. 28, 2011, the entire contents of which are hereby incorporated herein by reference.

FIELD OF THE INVENTION

The present invention relates to an image forming apparatus, and more particularly to an image forming apparatus for forming an image based on a job related to image formation.

BACKGROUND OF THE INVENTION

Recently, an image forming apparatus such as an MFP (Multi Function Peripheral) has been commercially available such that a display screen equipped with a touch panel as a user interface (hereinafter, also referred to as UI) is made larger with various functions such as a preview function which are easier to be used and improved so as to be easily viewable. With the trend toward high functionality or multi-functionality for the MFP in this manner, a load on a CPU provided in the MFP of course increases.

When processing ability of the CPU becomes insufficient, operation of the MFP is suppressed so that a user gets stressed because, for example, preview display is not smoothly performed, scan performance is degraded, or the like. In this case, a high-performance CPU with high processing ability is attached to the MFP so as to be able to attempt load reduction, however, the high-performance CPU is generally expensive, thus causing cost increases of the MFP. Therefore, various techniques have been proposed to use the CPU effectively without stressing a user out.

For example, Japanese Laid-Open Patent Publication No. 2007-164481 describes an MFP capable of dynamically changing job priority or a maximum executable number of jobs by an operating rate of a CPU or the like. With this MFP, a print job, a fax transmission job, an application execution job, and a mail transmission job are spooled in a spool queue, in which a job control portion calculates the number of jobs simultaneously executable based on job priority, and allows execution of the job having high priority even when the number of the executable jobs reaches a limit, then executes a job by a corresponding job execution task. The priority is corrected by the operating rate of the CPU to allow efficient execution of the job.

Here, in the case of processing a job with a high CPU load in the MFP, CPU utilization becomes nearly 100% in some cases. In this case, the CPU is occupied by job processing, thus influencing operation of a UI in the MFP. For example, responsiveness of the UI is degraded so that preview display is stopped on the way, operation of screen switching and the like become awkward, or the like, thus heavily stressing a user out with such a state which is directly visible.

Since it needs to put some flexibility into CPU utilization in order to smoothly operate the UI of the MFP, it is expected that the CPU utilization for being allocated to job processing or other functions is suppressed to, for example, about 80 to 90%. However, a high load is applied to the CPU depending on a job in some cases, thus posing a problem that it is difficult to suppress the CPU utilization up to 80 to 90% all the time. Moreover, to the contrary, placing priority on the operation of the UI influences processing of a job with a high load, thereby, for example, temporarily stopping print processing by a printer or reading processing by a scanner, or the like, thus stressing the user out also in this case.

For addressing such a problem, the technique described in Japanese Laid-Open Patent Publication No. 2007-164481 is to dynamically change job priority depending on CPU utilization, and not to attempt smooth operation of a UI without temporarily stopping processing of various jobs, thus not to solve the problem as described above.

SUMMARY OF THE INVENTION

An object of the present invention is to provide an image forming apparatus that attempts smooth operation of an UI without temporarily stopping processing of various jobs even in the case of lack of processing ability of a CPU so as to be able to relieve user's stress.

An object of the present invention is to provide an image forming apparatus forming an image based on a job related to image formation, comprising: a CPU for controlling operation of the image forming apparatus according to an operating condition that is set to the image forming apparatus; a job management table for sequentially registering input jobs by priority; and a job execution control portion for determining whether or not to permit execution of the job according to the order of registration from the job with high priority that is registered in the job management table, wherein the job execution control portion calculates, based on a job condition of the job intended for permission determination, utilization of the CPU associated with execution of the job, then restricts the operating condition of the image forming apparatus when the calculated CPU utilization exceeds a predetermined value, and permits execution of the job according to the restricted operating condition when CPU utilization at the time of restricting the operating condition becomes the predetermined value or lower.

Another object of the present invention is to provide the image forming apparatus further comprising a job priority table in which the type of a job is associated with priority of a job, wherein the job execution control portion sorts the jobs by priority for registering in the job management table based on the type of the input jobs with reference to the job priority table.

Another object of the present invention is to provide the image forming apparatus further comprising a CPU utilization table by job in which a job condition of the job is associated with CPU utilization by job, wherein the job execution control portion specifies, based on the job condition of the job intended for permission determination, the CPU utilization by job corresponding to the job condition of the job with reference to the CPU utilization table by job, and adds the specified CPU utilization by job to actual CPU utilization of the CPU that is measured at the time of specifying the CPU utilization by job, thereby calculating the utilization of the CPU associated with execution of the job.

Another object of the present invention is to provide the image forming apparatus, wherein restriction for the operating condition of the image forming apparatus is to delay a processing latency time between respective pages constituting the job intended for the permission determination.

Another object of the present invention is to provide the image forming apparatus further comprising a network transfer rate table in which the CPU utilization is associated with a network transfer rate, wherein the job execution control portion specifies, based on the CPU utilization associated with execution of the job, the network transfer rate corresponding to the CPU utilization with reference to the network transfer rate table, and when the specified network transfer rate is different from a default speed, changes the default speed to the specified network transfer rate.

BRIEF DESCRIPTION OF THE DRAWINGS

FIG. 4 is a diagram showing an example of a job priority table and a CPU utilization table by job;

PREFERRED EMBODIMENTS OF THE INVENTION

Hereinafter, description will be given for preferred embodiments according to an image forming apparatus of the present invention with reference to accompanying drawings.

Figure 1:
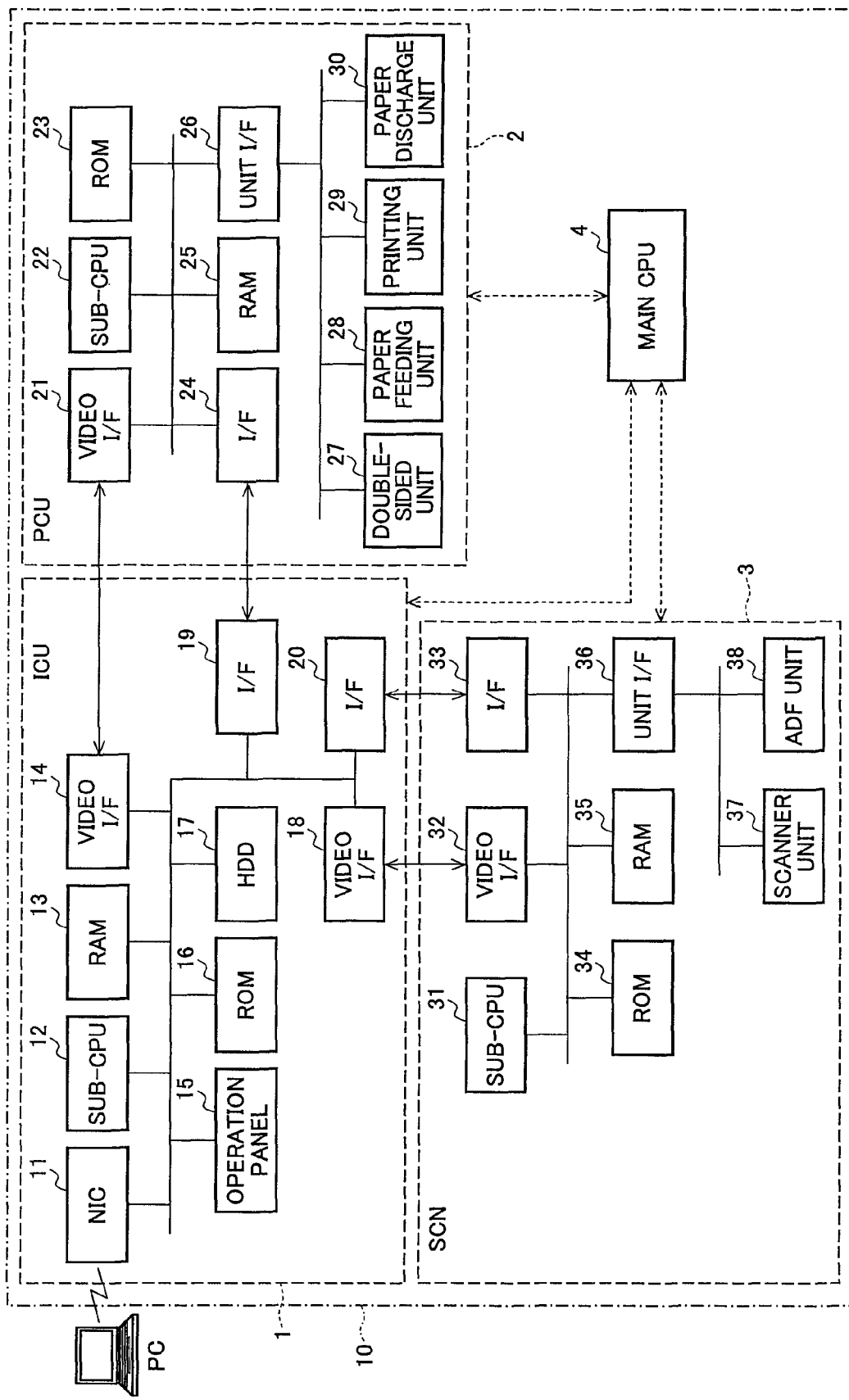
FIG. 1 is a block diagram showing a configuration example of hardware of an image forming apparatus according to an embodiment of the present invention.

FIG. 1 is a block diagram showing a configuration example of hardware of an image forming apparatus according to an embodiment of the present invention, and an image forming apparatus 10 is shown in the diagram. This image forming apparatus 10 is configured as a multi function peripheral (MFP) including functions of a scanner, copy, a printer, facsimile and the like. The image forming apparatus 10 (hereinafter, referred to as MFP 10) is provided with an image forming processing portion (ICU) 1 for rendering PDL data that is transmitted from a computer such as a PC to generate rendering image data, a printer control portion (PCU) 2 for performing image formation (printing) of the rendering image data that is generated at the ICU 1 on a medium such as a recording sheet, a scanner portion (SCN) 3 for reading a document image to output image data thereof, and a main CPU 4 that is connected to each of the ICU 1, the PCU 2 and the SCN 3 to control the entire operation of the MFP 10.

The ICU 1 is a part for performing rendering based on the PDL data received from a PC to generate image data (rendering image data), and provided with an NIC (Network Interface Card) 11 for performing communication with the PC, a sub-CPU 12 for controlling operation of the ICU 1, a RAM 13 serving as a volatile memory for developing and executing a control program and the like, a VIDEO I/F 14 and an I/F 19 for transmitting/receiving image data and the like to/from the PCU 2, an operation panel 15 for displaying an operation screen and various information while accepting user operation, a ROM 16 serving as a nonvolatile memory for storing the control program and the like, an HDD 17 serving as a hard disk for storing image data and the like, and a VIDEO I/F 18 and an I/F 20 for transmitting/receiving image data and the like to/from the SCN 3.

Further, the PCU 2 is a part for controlling a printing engine for printing, and provided with a VIDEO I/F 21 and an I/F 24 for transmitting/receiving image data and the like to/from the ICU 1, a sub-CPU 22 for controlling operation of the PCU 2, a ROM 23 for storing a control program and the like, a RAM 25 for developing and executing the control program and the like, a double-sided unit 27 for performing double-sided print processing, a printing unit 29 for performing printing (image formation) on a recording sheet, a paper feeding unit 28 for feeding a recording sheet to the printing unit 29, a paper discharge unit 30 for discharging the printed recording sheet, and a unit I/F 26 serving as an interface for each of the units and the sub-CPU.

The SCN 3 is provided with a VIDEO I/F 32 and an I/F 33 for transmitting/receiving image data and the like to/from the ICU 1, a sub-CPU 31 for controlling operation of the SCN 3, a ROM 34 for storing a control program and the like, a RAM 35 for developing and executing the control program and the like, a scanner unit 37 for optically reading a document image, an ADF unit 38 for feeding and conveying a document to a predetermined reading position, and a unit I/F 36 serving as an interface for each of the units and the sub-CPU.

Figure 2:
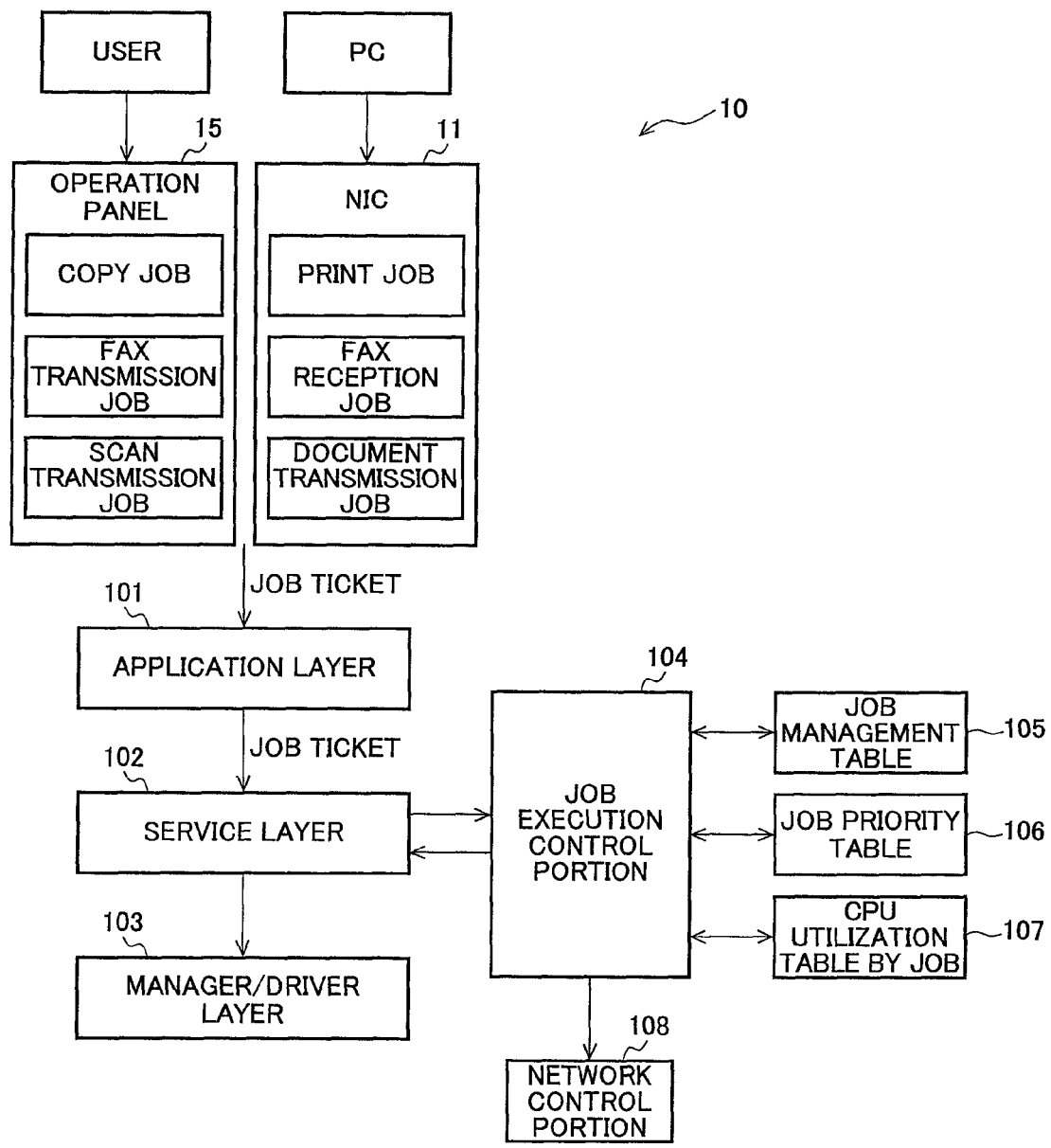
FIG. 2 is a block diagram showing an example of a characterizing part of an MFP according to the present invention.

FIG. 2 is a diagram showing an example of a characterizing part of the MFP 10 according to the present invention. In the diagram, 101 denotes an application layer, 102 denotes a service layer, 103 denotes a manager/driver layer, 104 denotes a job execution control portion, 105 denotes a job management table, 106 denotes a job priority table, 107 denotes a CPU utilization table by job, and 108 denotes a network control portion. In the case of performing copy, fax transmission, scan transmission and the like, a user is able to input an intended copy condition and the like from the operation panel 15 to instruct job execution. Additionally, in the case of performing printing, fax reception, document transmission and the like, the user is able to input an intended printing condition and the like from the PC via the NIC 11 to instruct job execution.

The operation panel 15 and the NIC 11 constitute a user interface layer, and the user interface layer performs processing for transmitting various jobs (for example, a copy job, a fax transmission job, a scan transmission job, a print job, a fax reception job, a document transmission job and the like) to the application layer 101.

The application layer 101 is operated according to an application for controlling various device functions included in the MFP 10, and realizes a cooperative job. Here, the cooperative job is a job that is realized by executing with combination of element jobs as appropriate such as a scan job, a print job, an image processing job and a communication job. For example, included are a copy job that is executed with combination of the scan job, the image processing job and the print job, a scan transmission job that is executed with combination of the scan job and the communication job, and the like.

The above-described application layer 101 includes a copy application for performing execution/control of the copy job, a print application for performing execution/control of the print job, a scan transmission application for performing execution/control of a scan transmission job for transmitting scanned image data to an external device, a document transmission application for performing execution/control of a document transmission job for transmitting a document that is kept in a document file to an external device, a fax reception application for performing execution/control of a fax reception job, a fax transmission application for performing execution/control of a fax transmission job, and the like.

The service layer 102 is a layer that is located below the application layer 101, and controls various element jobs included in the MFP 10 according to an instruction from the application layer 101. The service layer 102 includes scan service for controlling scan operation, print service for controlling print operation based on a print job and a copy job, job log service for controlling for the purpose of management of a log per job, image processing service for controlling image forming processing such as image creation, file service for controlling for the purpose of management of image data such as document filing, WWW server service for controlling for the purpose of remote access through a Web page, network service for controlling communication operation with a LAN, a telephone line or the like, and the like.

The manager/driver layer 103 is a layer that is located below the service layer 102, and performs operation according to software for controlling hardware of the MFP 10. The manager/driver layer 103 includes an ASIC driver for controlling a printing engine, a USB driver for performing USB communication, a serial communication driver for performing serial communication, an NIC driver for controlling the NIC 11 to perform LAN communication, an LCD driver for performing display control of the operation panel 15, a power management driver for performing power management, and the like.

The application layer 101, the service layer 102 and the manager/driver layer 103 described above constitute a common MFP, and are realized with software.

A main characterizing part of the present invention is described that, even in the case of lack of processing ability of the CPU, various jobs are executed in order of priority without impairing operation of the UI so as to be able to relieve user's stress. As a configuration for such a purpose, the MFP 10 is provided with a main CPU 4 corresponding to a CPU for controlling operation of the MFP 10 according an operating condition set to the MFP 10, the job management table 105 for sequentially registering the input job by priority, and the job execution control portion 104 for determining whether or not to permit execution of a job according to the order of registration starting from a job with high priority that is registered in the job management table 105.

The job execution control portion 104 calculates, based on a job condition of a job intended for permission determination, utilization of the main CPU 4 associated with execution of the job, then restricts an operating condition of the MFP 1 in a case where the calculated CPU utilization exceeds a predetermined value, and permits execution of a job according to the restricted operating condition in a case where the CPU utilization at the time of restricting the operating condition becomes the predetermined value or lower. Note that, the utilization of the main CPU 4 associated with execution of a job (hereinafter, CPU utilization) is referred to as utilization of the main CPU 4 at the time of adding the CPU utilization by job in execution of each job to actual CPU utilization of the main CPU 4. Moreover, the predetermined value may be set so as to have a 10 to 20% extra in the CPU utilization all the time in order not to impair operation without degrading responsiveness of a UI (user interface) such as the operation panel 15. Namely, the predetermined value may be settable as appropriate in a range of the CPU utilization of 80 to 90%.

In this manner, input jobs are sequentially registered by priority, and a job is executed in order of priority by restricting the operating condition of the MFP 1 so that the utilization of the main CPU 4 associated with execution of the input job does not exceed a value required for smooth operation of the UI. Accordingly, even in the case of lack of processing ability of the main CPU 4, it is possible to operate the UI smoothly without temporarily stopping job processing, thus making it possible to relieve user's stress. Hereinafter, description will be concretely given for job execution control according to the present invention.

Figure 3:
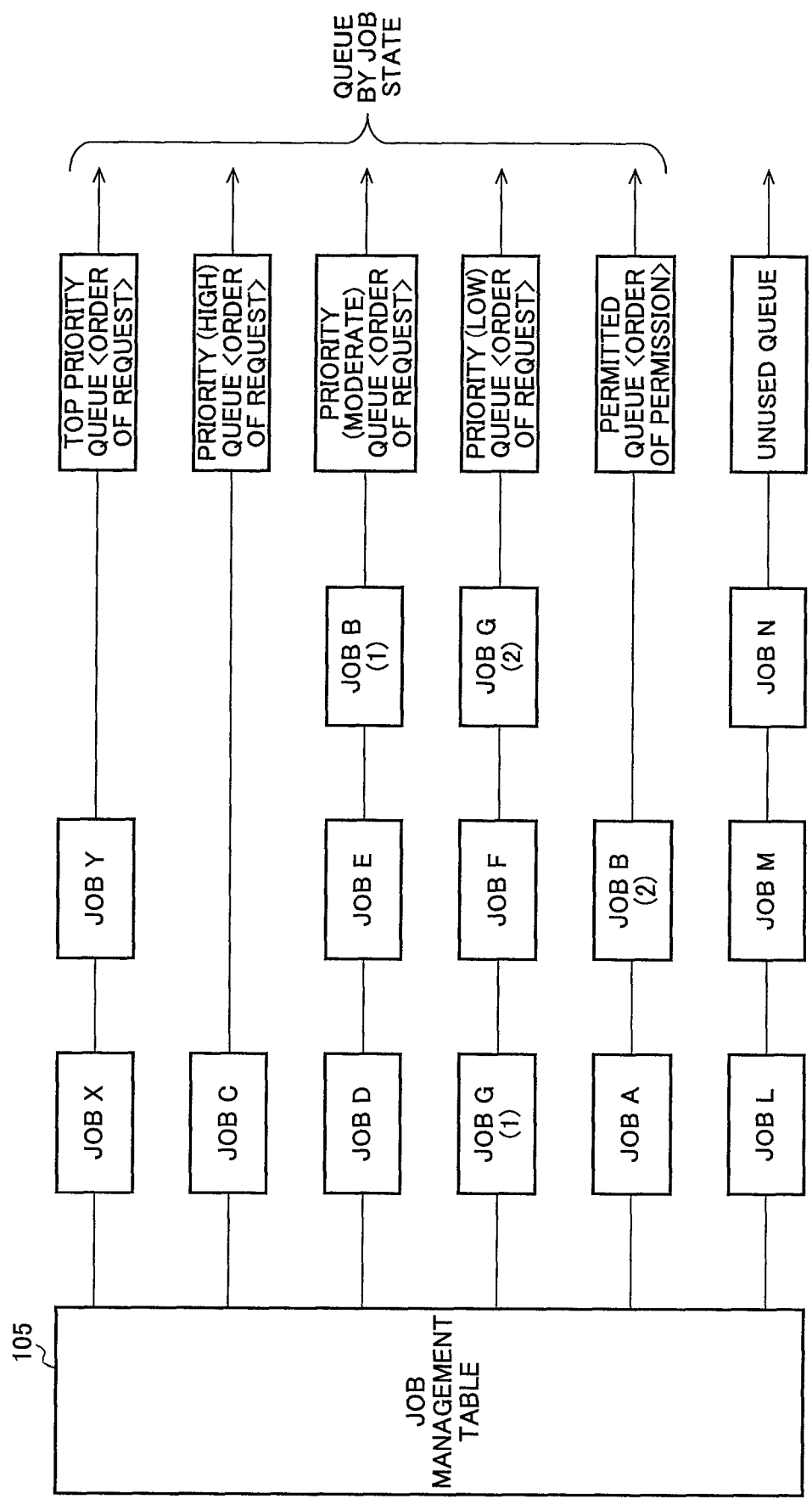
FIG. 3 is a diagram showing an example of a job management table.

FIG. 3 is a diagram showing an example of the job management table 105. The job management table 105 is broadly divided into a queue by job state in which pending jobs are sequentially registered by priority, and an unused queue in which a processed job is registered. Note that, in a normal case, all jobs that are registered in the queue by job state are also registered in a currently-used queue, however, description of the currently-used queue is omitted for convenience of explanation. The queue by job state is comprised of four request queues by priority (top priority, high priority, moderate priority and low priority), and one permitted queue.

FIG. 4 is a diagram showing an example of the job priority table 106 and the CPU utilization table by job 107. The job priority table 106 is a table in which the type of jobs (copy job, print job, and the like) is associated with priority (1 to 10, or the like) of a job. In this example, top priority is placed on a copy job, followed by a scan transmission job, a fax transmission job, . . . , in descending order of priority. Then, in the job priority table 106, for example, jobs with the priority 1 to 3 are set in advance so as to be registered in the priority (high) queue of the job management table 105 of FIG. 3. Similarly, jobs with the priority 4 to 6 are set in advance so as to be registered in the priority (moderate) queue, and jobs with the priority 7 and subsequent priority are set in advance so as to be registered in the priority (low) queue. In this manner, a registration queue may be set in advance corresponding to priority of each job.

In the case described above, the job execution control portion 104 sorts input jobs by priority for registering in the job management table 105 based on the type of the input jobs with reference to the job priority table 106. Note that, in the job management table 105 of FIG. 3, in a top priority queue, a job that is assigned in advance as a top priority job by a user is registered. For example, a fax transmission job in which the time is appointed and the like are included therein. The job that is registered in the top priority queue is top priority so as to be given top priority to be executed, however, a job with a relatively-low CPU load such as the above-described fax transmission job in which the time is appointed or the like is generally registered.

Here, in the application layer 101, a job ticket related to an input job is input. The job ticket is generated by the main CPU 4 based on a job condition that is assigned by a user on the operation panel 15, or a job condition that is assigned by a printer driver on a PC side, followed by input to the application layer 101. In the job ticket, various job conditions are described in association with document data or image data. Further, the job condition includes, for example, the type of jobs (copy job, print job and the like), the size of sheets (A4, A3 and the like), a paper feeding cassette, a paper discharge tray, a color mode (color/black and white), and the like. Note that, the method of obtaining the job condition is not limited to the job ticket, and for example, the job condition may be obtained from job information and the like.

The job execution control portion 104 is able to obtain the job ticket via the application layer 101 and the service layer 102 to determine the type of the input job. Then, when the determined type of the input job is, for example, a copy job, it is possible to specify that the input job is the priority "1" with reference to the job management table 105. Then, the input job of the priority "1" is registered in the priority (high) queue of the job management table 105 according to the above-described setting of the registration queue.

Additionally, the CPU utilization table by job 107 is a table in which a job condition of a job is associated with CPU utilization by job. The job execution control portion 104 specifies, based on the job condition of a job intended for permission determination, the CPU utilization by job corresponding to the job condition of the job intended for permission determination with reference to the CPU utilization table by job 107, and adds the specified CPU utilization by job to actual CPU utilization of the main CPU 4 which is measured when the CPU utilization by job is specified, thereby calculating the CPU utilization of the main CPU 4. Note that, the job execution control portion 104 always monitors the actual utilization of the main CPU 4, and is able to measure/obtain the actual CPU utilization of the main CPU 4 before job execution.

The above-described job condition is able to be obtained from the job ticket as described above. For example, in a case where the job condition of the input job is "A4/color copy", the CPU utilization by job when the copy job is executed is estimated as "20%" by the CPU utilization table by job 107. Then, in a case where the actual CPU utilization at the present moment (moment before executing the copy job) is, for example, "75%", the copy job is executed, whereby the CPU utilization by job of "20%" is added so that the CPU utilization is calculated as "95%".

Then, since the CPU utilization of "95%" that is calculated as described above exceeds a predetermined value (here, 90%), the job execution control portion 104 restricts the operating condition of the MFP 1 to determine whether or not the CPU utilization at the time of restricting the operating condition becomes the predetermined value or lower. The method of restricting the operating condition will be described below, which is expected to include, for example, a method of delaying the processing latency time between respective pages constituting a job, a method of delaying a page print rate and/or a page read rate per unit time of a job, and the like. Then, the job execution control portion 104 permits, in the case of determining that the CPU utilization at the time of restricting the operating condition becomes the predetermined value or lower, execution of a job according to the restricted operating condition.

Further, in a case where the CPU utilization by job by the above-described copy job is estimated as "20%", and the actual CPU utilization at the present moment (moment before executing the copy job) is, for example, "50%", the copy job is executed, whereby the CPU utilization by job of "20%" is added so that the CPU utilization is calculated as "70%". In this case, because of not exceeding the above-described predetermined value of "90%", the job execution control portion 104 permits execution of a job without restricting the operating condition of the MFP 1.

Additionally, the job execution control portion 104 monitors, in the case of determining that the CPU utilization at the time of restricting the operating condition does not become the predetermined value or lower, transitions of the actual CPU utilization of the main CPU 4, and may permit execution of a job when the CPU utilization in the case of adding the CPU utilization by job at the time of restricting the operating condition to the actual CPU utilization becomes the predetermined value or lower.

Figure 5:
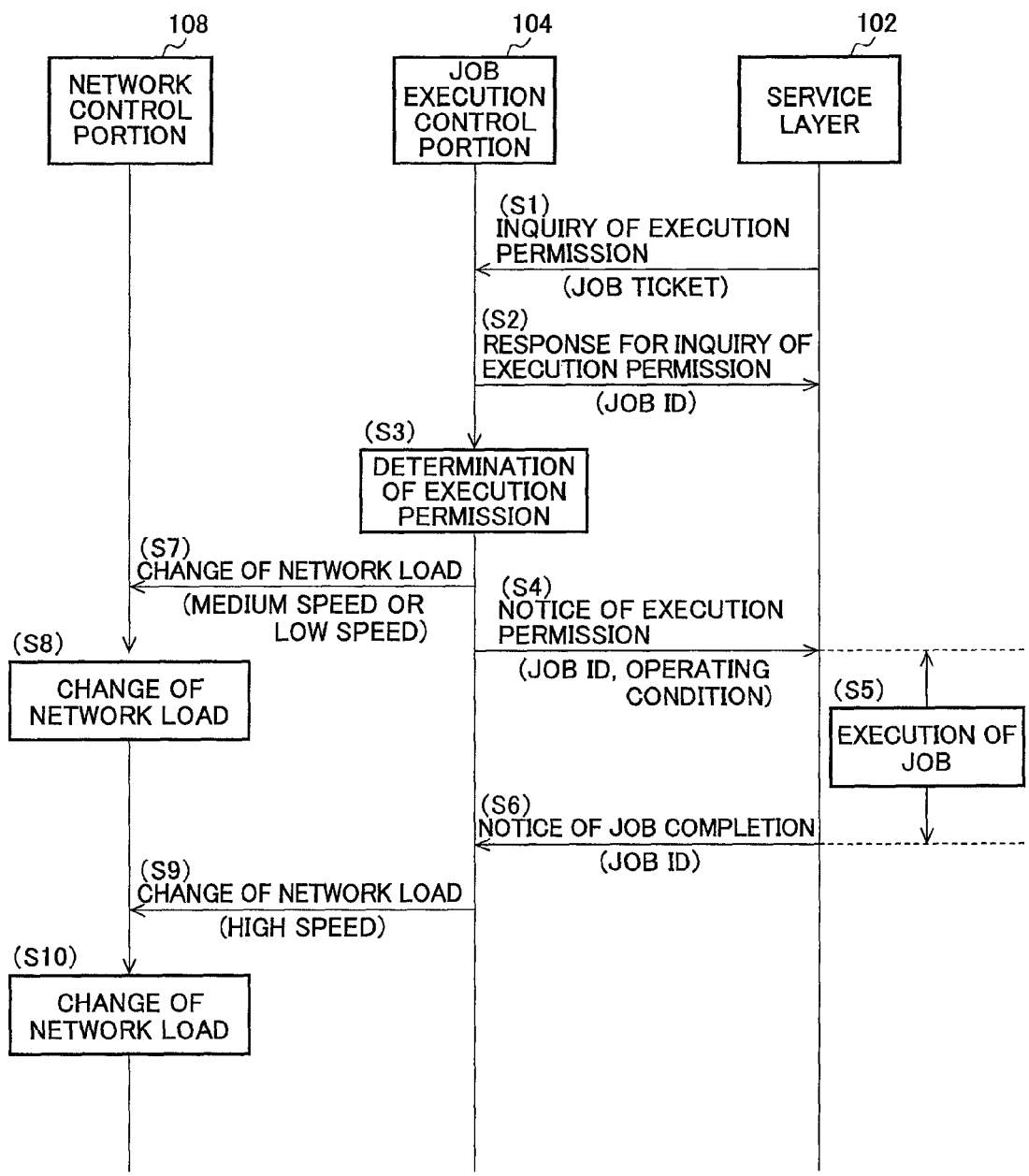
FIG. 5 is a diagram for explaining an example of a job execution control sequence according to the present invention.

FIG. 5 is a diagram for explaining an example of a job execution control sequence according to the present invention. First, concerning the job intended for permission determination among jobs registered in the job management table 105, the service layer 102 performs an inquiry about execution permission including the job ticket by page or by job to the job execution control portion 104 (S1), and the job execution control portion 104 that receives the inquiry about execution permission returns a response for the inquiry about execution permission including job ID (S2). Next, the job execution control portion 104 performs execution permission determination by page or by job (S3), and in a case where the job is executable, transmits a notice of execution permission to the service layer 102 with the job ID and the operating condition (S4).

Next, the service layer 102 that receives the notice of execution permission executes the job based on the operating condition (S5), and when the job is completed, sends a notice of job completion to the job execution control portion 104 with the job ID (S6). Moreover, the job execution control portion 104 transmits, in the case of determining that there is a need to change a network load (that is, network transfer rate) after performing the execution permission determination at S3 described above, a notice of network load change to the network control portion 108 (S7). Such processing at S7 will be described below.

The MFP 10 is provided with a network transfer rate table (not shown) in which CPU utilization is associated with a network transfer rate. The network transfer rate is a transfer rate in the case of using a network protocol of the TCP/IP or the like, which is set to 100% at a maximum. Additionally, for example, for the network transfer rate, three phases may be settable such as the state of 100% as "high speed", the state of 90% or higher and lower than 100% as "medium" and the state of 80% or higher and lower than 90% as "low". Moreover, for example, the "low" network transfer rate corresponds to the CPU utilization of 90% or higher and 100% or lower, the "medium" network transfer rate corresponds to the CPU utilization of 60% or higher and lower than 90%, and the "high" network transfer rate corresponds to the CPU utilization of lower than 60%.

At S3 described above, when the CPU utilization associated with execution of a job is calculated as, for example, 80%, the job execution control portion 104 is able to specify the network transfer rate corresponding to the utilization of the main CPU 4 based on the CPU utilization (80%) associated with execution of a job with reference to the network transfer rate table. In this case, the "medium" network transfer rate is appropriate. Then, when the specified network transfer rate (here, "medium") is different from a default speed, the job execution control portion 104 instructs the network control portion 108 to change the default speed to the specified network transfer rate. In the example of FIG. 5, it is determined that there is a change because the default speed is set to "high", then at S7, the notice of network load change is transmitted from the job execution control portion 104 to the network control portion 108, and the network control portion 108 that receives the notice changes the network transfer rate, that is, the network transfer rate from "high" to "medium" (S8).

Further, the job execution control portion 104 performs, in the case of receiving the notice of job completion at S6, subtraction of the CPU utilization with completion of the job. As the result of the subtraction, for example, in a case where the CPU utilization becomes 50%, the corresponding network transfer rate becomes "high". Therefore, the job execution control portion 104 transmits the notice of network load change again to the network control portion 108 (S9), and the network control portion 108 that receives the notice changes the network transfer rate from "medium" to "high" (S10).

Note that, at S7 and S9, the notice of network load change from the job execution control portion 104 to the network control portion 108 is not transmitted in a case where any change is not made in the network transfer rate. Namely, only in a case where there is a change in the network transfer rate, the network transfer rate is changed.

Figure 6:
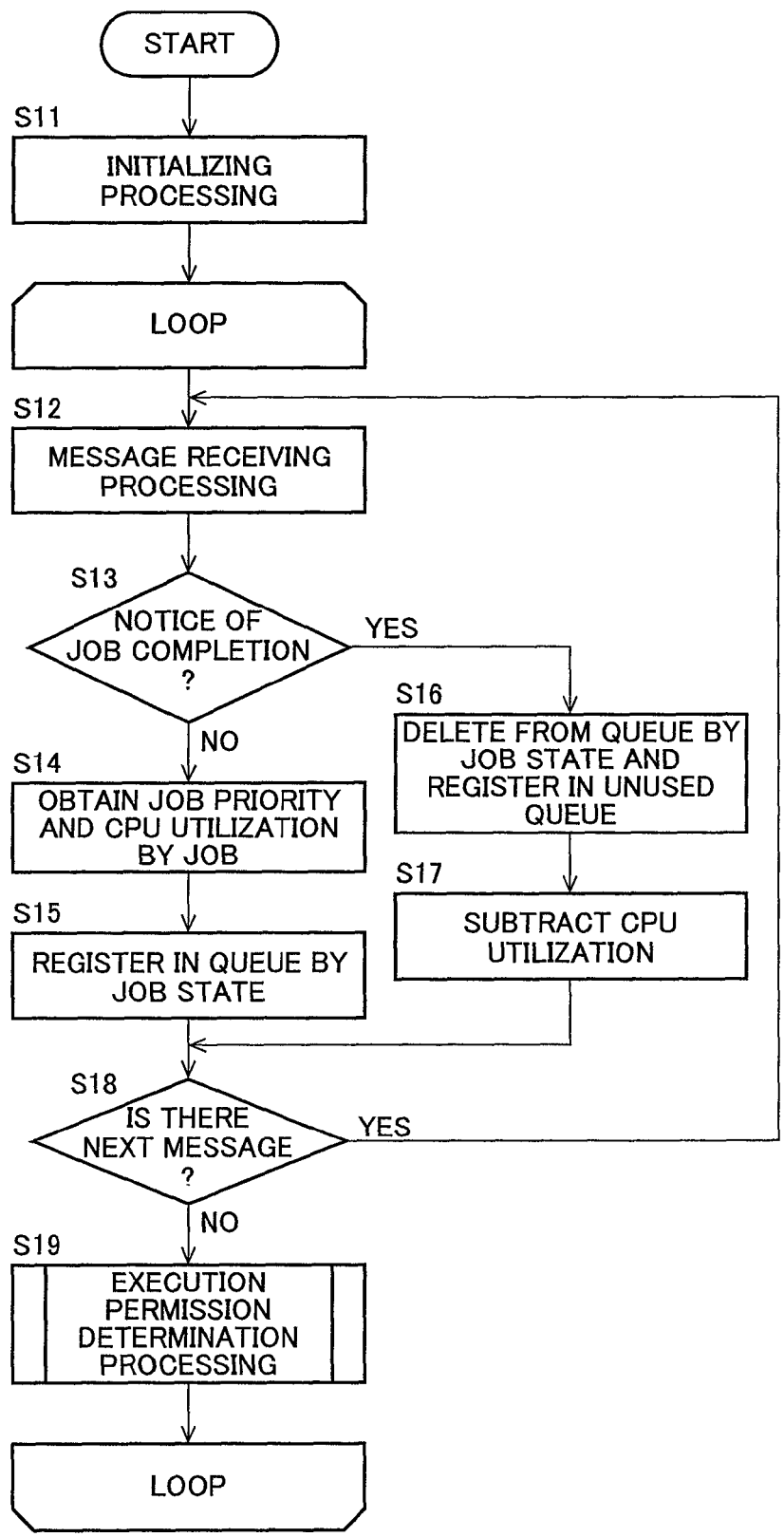
FIG. 6 is a flowchart for explaining an operation example of a job execution control portion according to the present invention.

FIG. 6 is a flowchart for explaining an operation example of the job execution control portion 104 according to the present invention. First, the job execution control portion 104 performs initializing processing (step S11), and performs receiving processing of a message concerning a job from the service layer 102 (step S12). Next, the received message is determined whether or not to be the notice of job completion (step S13), and in the case of determining not to be the notice of job completion, that is, determining to be the inquiry about execution permission, (in the case of NO), based on the job ticket, the job priority and the CPU utilization by job corresponding to the input job are obtained with reference to the CPU utilization table by job 107 (step S14).

Next, the job execution control portion 104 registers the input job in the queue by job state of the job management table 105 of FIG. 3 based on the job priority that is obtained at step S14 (step S15), and determines whether or not there is a next message (step S18). Additionally, at step S13, in the case of determining that the received message is the notice of job completion (in the case of YES), the completed job is deleted from the queue by job state to be registered in the unused queue (step S16). Then, the CPU utilization is subtracted (step S17), and the process goes to step S18.

Next, the job execution control portion 104 returns, in the case of determining that there is a next message at step S18 (in the case of YES), to step S12 to repeat the processing. Further, in the case of determining that there is no next message (in the case of NO), execution permission determination processing is performed for each job that is registered in the job management table 105 (step S19).

Figure 7:
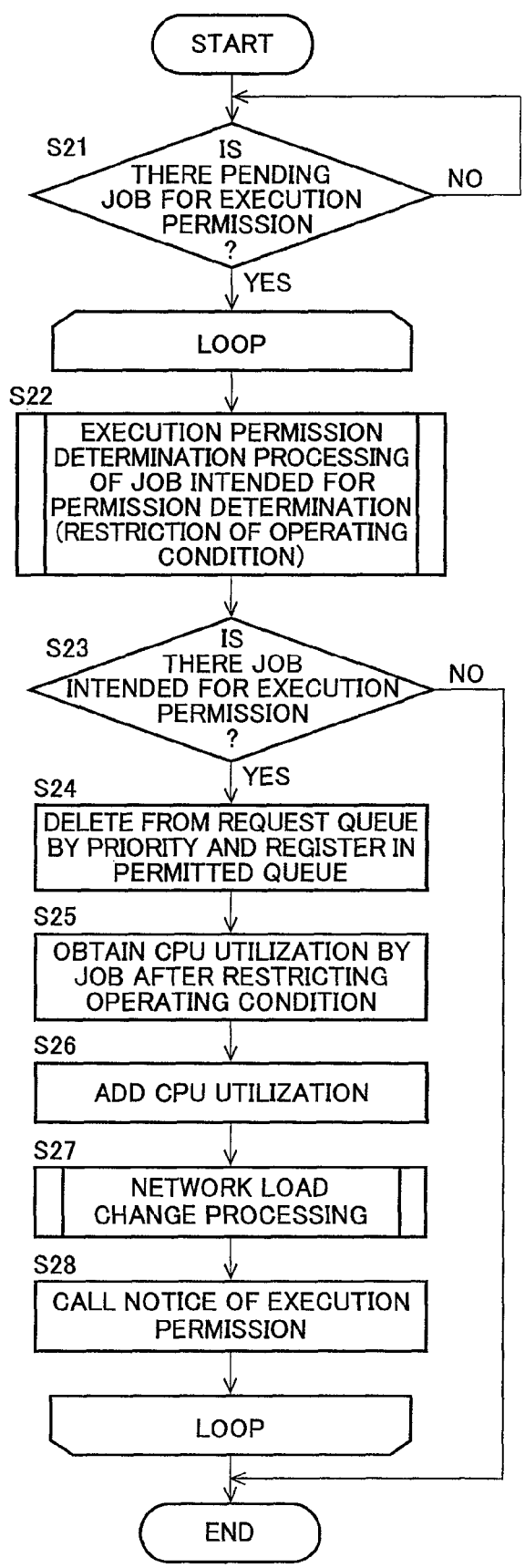
FIG. 7 is a flowchart for explaining an example of execution permission determination processing at step S19 of FIG. 6.

FIG. 7 is a flowchart for explaining an example of the execution permission determination processing at step S19 of FIG. 6. First, the job execution control portion 104 searches the request queue by priority (that is, a top priority queue, a priority (high) queue, a priority (moderate) queue or a priority (low) queue) of the job management table 105 of FIG. 3 in order of priority, and determines whether or not there is a pending job for execution permission (step S21). In the case of determining that there is the pending job for execution permission (in the case of YES), the process goes to step S22 to execute the execution permission determination processing for the pending job for execution permission (also referred to as a job intended for permission determination), and restriction of the operating condition is performed as necessary (step S22). Additionally, at step S21, in the case of determining that there is no pending job for execution permission (in the case of NO), the process goes to a standby state at step S21.

Next, the job execution control portion 104 determines whether or not there is the job intended for execution permission as the result of the execution permission determination processing at step S22 (step S23) and in the case of determining that there is the job intended for execution permission (in the case of YES), deletes the job intended for execution permission from the request queue by priority for registering in the permitted queue (step S24). Further, at step S23, in the case of determining that there is no job intended for execution permission (in the case of NO), then the process is finished.

Next, the job execution control portion 104 obtains the CPU utilization by job after restricting the operating condition at step S22 (step S25), and adds the obtained CPU utilization by job to the actual CPU utilization to calculate the CPU utilization (step S26). Then, in a case where there is a change of a network load (network transfer rate), change processing of the network transfer rate is performed (step S27), followed by calling the notice of execution permission (step S28).

Here, description will be given for an example of the method of restricting the operating condition. As described above, the method is expected to include a first method of delaying the processing latency time between respective pages constituting a job, and a second method of delaying a page print rate and/or a page read rate per unit time of a job. By the first method, the job execution control portion 104 delays the processing latency time between respective pages constituting a job from a default latency time in a phased manner. Specifically, in each processing, for example, in print processing or scan processing, the processing latency time (interval) between pages is set to four phases, for example. As the default latency time, "Wms" (ms: millisecond) is set in a first phase, "Xms" is set as the latency time in a second phase, "Yms" is set as the latency time in a third phase and "Zms" is set as the latency time in a fourth phase.

In the case described above, it is possible to decide whether to add to the default latency time in the first phase to what extent on the basis of, for example, a data processing time for each job. Specifically, in the case of a model for which the processing time of about Vms per page in the print job of A4-size sheets is taken, this processing time (Vms) is added to the default latency time (Wms) as a base processing time. Thereby, a latency time X in the second phase is set to W+V. Then, for the latency time Y in the third phase and the latency time Z in the fourth phase, the base processing time (Vms) X 2=2 V and the base processing time (Vms) X 3=3 V may be added to the default latency time (Wms), respectively.

Additionally, the job execution control portion 104 preferably sets, in the case of delaying the above-described processing latency time from the default latency time in a phased manner, a minimum value of the processing latency time in which the CPU utilization becomes a predetermined value or lower. For example, in a case where the CPU utilization during the default latency time in the first phase exceeds the predetermined value, the latency time in the second phase is set to calculate the CPU utilization during the latency time in the second phase. It is possible to roughly estimate the CPU utilization at the time based on the following formula (1). Note that, default CPU utilization is the CPU utilization by job for each job, and a value shown in the CPU utilization table by job 107 of FIG. 4.

$$CPU \text{ utilization (\%)} = \text{actual } CPU \text{ utilization (\%) at the present moment} + \text{default CPU utilization (\%)} \times \text{default latency time [ms]/latency time in each phase [ms]} \qquad \text{formula (1)}$$

In the above-described formula (1), where the actual CPU utilization at the present moment is 75%, the default latency time is W and the default CPU utilization at the time is 20%, because the latency time in the second phase is W+V, the CPU utilization in the second phase is obtained as (75+20×W/(W+V))%. Similarly, (75+20×W/(W+2 V))% for the latency time (W+2 V) in the third phase and (75+20×W/(W+3 V))% for the latency time (W+3 V) in the fourth phase are able to be obtained. Here, for the default latency time in the first phase, the CPU utilization (here, 95%) exceeds a predetermined value (for example, 90%), however, in a case where any one of the latency times in the second phase to the fourth phase is set, thereby making it possible to make the CPU utilization the predetermined value or lower, it is preferable to set a minimum value at the time, that is, the latency time (W+V) in the second phase. This makes it possible to effectively execute a job for as short a processing time as possible while suppressing the CPU load.

Further, by the second method, the job execution control portion 104 delays a page print rate and/or a page read rate per unit time of a job from the default speed in a phased manner. Concrete description will be given for the page print rate in the print processing (PPM: Page Per Minute) as an example, in which, for example, PPM is set to four phases. "50 pages/minute" are set as the default value (default PPM) at a first phase, "37.5 pages/minute" are set as $\frac{3}{4}$ of the default value at a second phase, "25 pages/minute" are set as $\frac{2}{4}$ of the default value at a third phase and "12.5 pages/minute" are set as $\frac{1}{4}$ of the default value at a fourth phase.

Additionally, the job execution control portion 104 preferably sets a maximum value of the PPM in which the CPU utilization becomes the predetermined value or lower in the case of delaying the PPM of a job in a phased manner. For example, when the CPU utilization in the case of the default PPM in the first phase exceeds the predetermined value, the PPM in the second phase is set to calculate the CPU utilization in the case of the PPM in the second phase. It is possible to roughly estimate the CPU utilization at the time based on the following formula (2). Note that, the default CPU utilization is the CPU utilization by job for each job, and a value of the CPU utilization table by job 107 of FIG. 4.

$$CPU \text{ utilization (\%)} = \text{actual } CPU \text{ utilization (\%) at the present moment} + \text{default CPU utilization (\%)} \times PPM \text{ [page/minute] at each phase/default PPM [page/minute]} \quad \text{formula (2)}$$

In the above-described formula (2), where, for example, the actual CPU utilization at the present moment is 75%, the default PPM is 50 pages/minute and the default CPU utilization at the time is 20%, because the PPM in the second phase is 37.5 pages/minute, the CPU utilization in the second phase is obtained as 90%. Similarly, 85% for 25 pages/minute of the PPM in the third phase and 80% for 12.5 pages/minute of the PPM in the fourth phase are able to be obtained. Here, it is possible to make the CPU utilization a predetermined value (for example, 90%) or lower even in a case where any one of the PPM is set in the second phase to the fourth phase, however, it is preferable to set a maximum value at the time, that is, 37.5 pages/minute of the PPM in the second phase. This makes it possible to effectively execute a job for as short a processing time as possible while suppressing the CPU load. Note that, also for the page read rate in the scan processing, it is possible to execute in the similar manner as the case of the PPM described above.

Figure 8:
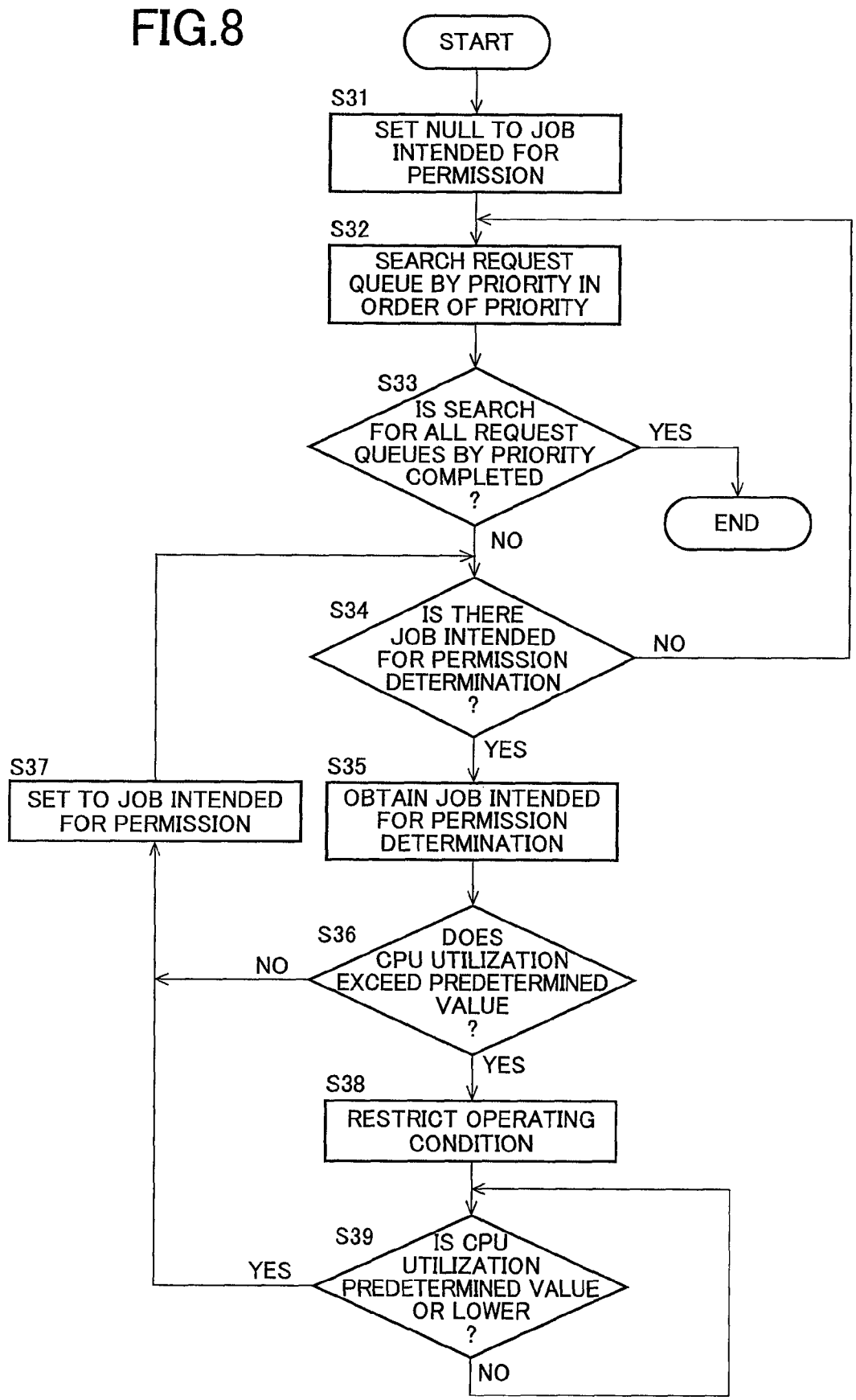
FIG. 8 is a flowchart for explaining an example of operating condition restriction processing at step S22 of FIG. 7.
Figure 9:
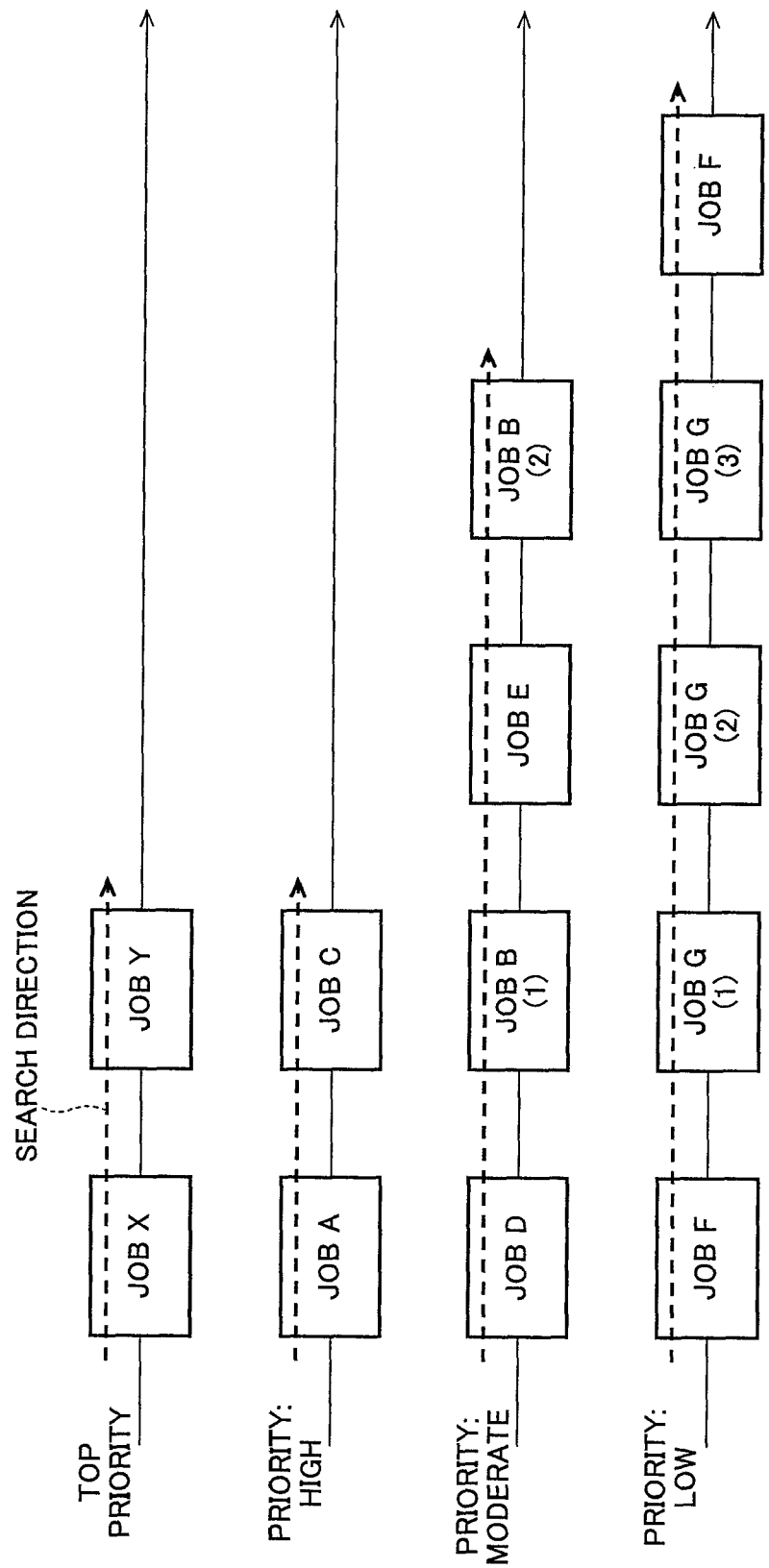
FIG. 9 is a diagram showing an example of a search direction in a job management table.

FIG. 8 is a flowchart for explaining an example of operating condition restriction processing at step S22 of FIG. 7. FIG. 9 is a diagram showing an example of a search direction in the job management table 105. First, the job execution control portion 104 sets NULL to a job intended for permission (step S31), and along the search direction shown in FIG. 9, searches the request queue by priority (a top priority queue, a priority (high) queue, a priority (moderate) queue and a priority (low) queue) in order of priority (step S32). Next, search for all request queues by priority is determined whether or not to be completed (step S33), and in the case of determining that the search is completed (in the case of YES), then the process is finished. Moreover, at step S33, in the case of determining that the search is not completed (in the case of NO), a job intended for permission determination is determined whether or not to be in the request queue by priority intended for search (step S34).

Next, the job execution control portion 104 returns to step S32 in the case of determining that there is no job intended for permission determination at step S34 (in the case of NO), and searches the request queue by priority of next priority. Additionally, at step S34, in the case of determining that there is the job intended for permission determination (in the case of YES), the jobs intended for permission determination are obtained in order of registration (step S35). Then, based on the CPU utilization table by job 107 of FIG. 4, the CPU utilization associated with execution of the job intended for permission determination that is obtained at step S35 is determined whether or not to exceed the predetermined value (step S36), and in the case of determining that the CPU utilization exceeds the predetermined value (in the case of YES), the operating condition is restricted by means of the first method or the second method described above (step S38).

Further, at step S36, in the case of determining that the CPU utilization becomes the predetermined value or lower (in the case of NO), the process goes to step S37, and the job intended for permission determination is set to the job intended for permission, then returning to step S34 to repeat the processing. Then, the CPU utilization at the time of restricting the operating condition at step S38 is determined whether or not to be the predetermined value or lower (step S39), and in the case of determining that the CPU utilization at the time of restricting the operating condition is determined to be the predetermined value or lower (in the case of YES), the process goes to step S37 to set the job intended for permission determination to the job intended for permission, then returning to step S34 to repeat the processing.

Further, at step S39, in the case of determining that the CPU utilization when the operating condition is restricted exceeds the predetermined value (in the case of NO), the process goes to a standby state until the CPU utilization becomes the predetermined value or lower at step S39. Namely, transitions of the actual CPU utilization of the main CPU 4 are monitored, and when the CPU utilization at the time of adding the CPU utilization by job in the case of restricting the operating condition to the actual CPU utilization becomes the predetermined value or lower, the job intended for permission is set. In other words, in a case where the CPU utilization at the time of restricting the operating condition does not become the predetermined value or lower for the job intended for permission determination, the job execution control portion 104 does not allow a next job to be intended for permission determination until execution of the job is permitted.

Description will be given for the case described above with a specific example. When a job A is intended for permission determination in the priority (high) queue of FIG. 9, in a case where there is an extra of the actual CPU utilization which is the predetermined value or lower but the CPU utilization exceeds the predetermined value by execution of the job A, a next job of the job A (here, job C) is not intended for permission determination. In this case, the job C is intended for permission determination after the job A is permitted.

Figure 10:
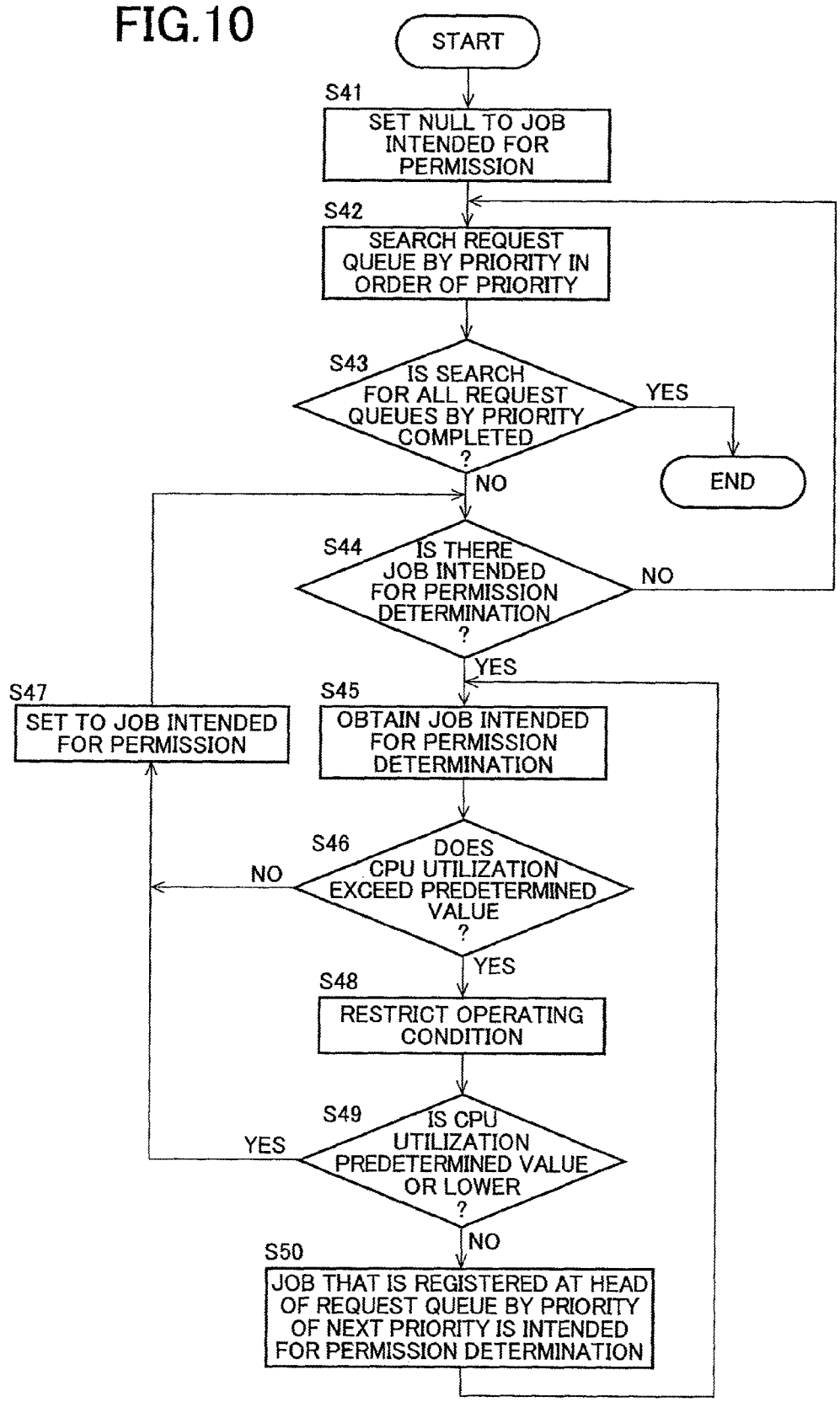
FIG. 10 is a flowchart for explaining another example of the operating condition restriction processing at step S22 of FIG. 7.
Figure 11:
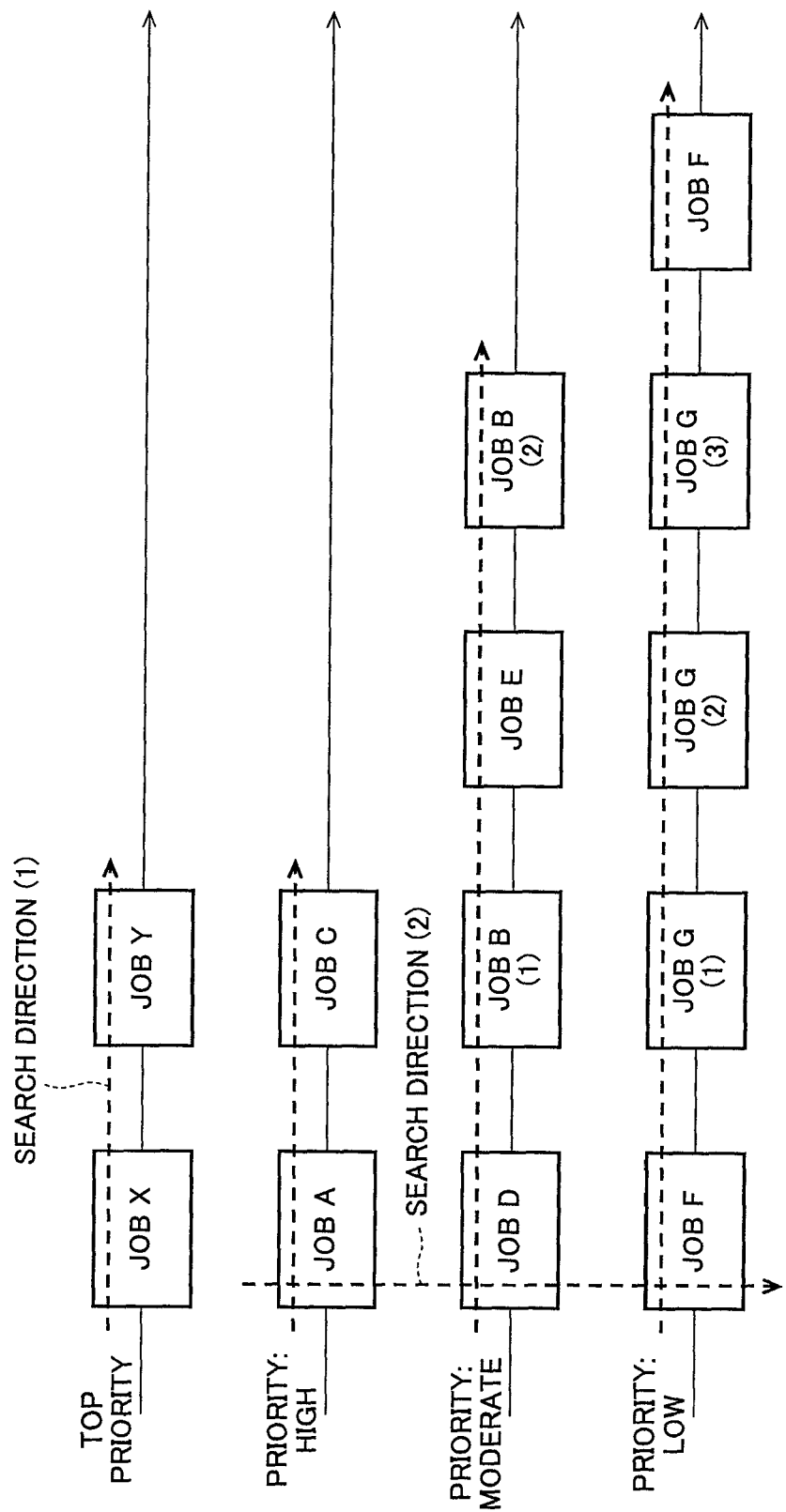
FIG. 11 is a diagram showing another example of a search direction in a job management table 105.

FIG. 10 is a flowchart for explaining another example of the operating condition restriction processing at step S22 of FIG. 7. FIG. 11 is a diagram showing another example of the search direction in the job management table 105. First, the job execution control portion 104 sets NULL to a job intended for permission (step S41), and along a search direction shown in FIG. 11, searches the request queue by priority (in order of a top priority queue, a priority (high) queue, a priority (moderate) queue and a priority (low) queue) in order of priority (step S42). Next, search for all the request queues by priority are determined whether or not to be completed (step S43), and in the case of determining that the search is completed (in the case of YES), then the process is finished. Moreover, at step S43, in the case of determining that the search is not completed (in the case of NO), a job intended for permission determination is determined whether or not to be in the request queue by priority intended for search (step S44).

Next, the job execution control portion 104 returns to step S42 in the case of determining that there is no job intended for permission determination at step S44 (in the case of NO), and searches the request queue by priority of next priority. Additionally, at step S44, in the case of determining that there is the job intended for permission determination (in the case of YES), the jobs intended for permission determination are obtained in order of registration (step S45). Then, based on the CPU utilization table by job 107 of FIG. 4, the CPU utilization associated with execution of the job intended for permission determination that is obtained at step S45 is determined whether or not to exceed the predetermined value (step S46), and in the case of determining that the CPU utilization exceeds the predetermined value (in the case of YES), the operating condition is restricted by means of the first method or the second method described above (step S48).

Further, at step S46, in the case of determining that the CPU utilization becomes the predetermined value or lower (in the case of NO), the process goes to step S47, and the job intended for permission determination is set to the job intended for permission, then returning to step S44 to repeat the processing. Then, the CPU utilization at the time of restricting the operating condition at step S48 is determined whether or not to be the predetermined value or lower (step S49), and in the case of determining that the CPU utilization at the time of restricting the operating condition is determined to be the predetermined value or lower (in the case of YES), the process goes to step S47 to set the job intended for permission determination to the job intended for permission, then returning to step S44 to repeat the processing.

Further, at step S49, in the case of determining that the CPU utilization when the operating condition is restricted exceeds the predetermined value (in the case of NO), the process goes to step S50, and along a search direction (2) of FIG. 11, a job that is registered at the head of the request queue by priority of next priority is intended for permission determination (step S50), then returning to step S45 to repeat the processing. That is, in a case where the CPU utilization when the operating condition is restricted does not become the predetermined value or lower for the job intended for permission determination, the job execution control portion 104 allows the job that is registered at the head of lower priority than priority of the job to be intended for permission determination.

Description will be given for the case described above with a specific example. When the job A is intended for permission determination in the priority (high) queue of FIG. 11, in a case where there is an extra of the actual CPU utilization which is the predetermined value or lower but the CPU utilization exceeds the predetermined value by execution of the job A, a next job of the job A (job C) is not intended for permission determination, and a job D that is registered at the head of the next priority (moderate) queue is intended for permission determination. Then, when execution of the job D is not permitted, a job F that is registered at the head of the next priority (low) queue is intended for permission determination. Further, when execution of the job F is not permitted, the process returns to the priority (high) queue, and the job A that is registered at the head of the priority (high) queue is intended for permission determination.

Figure 12:
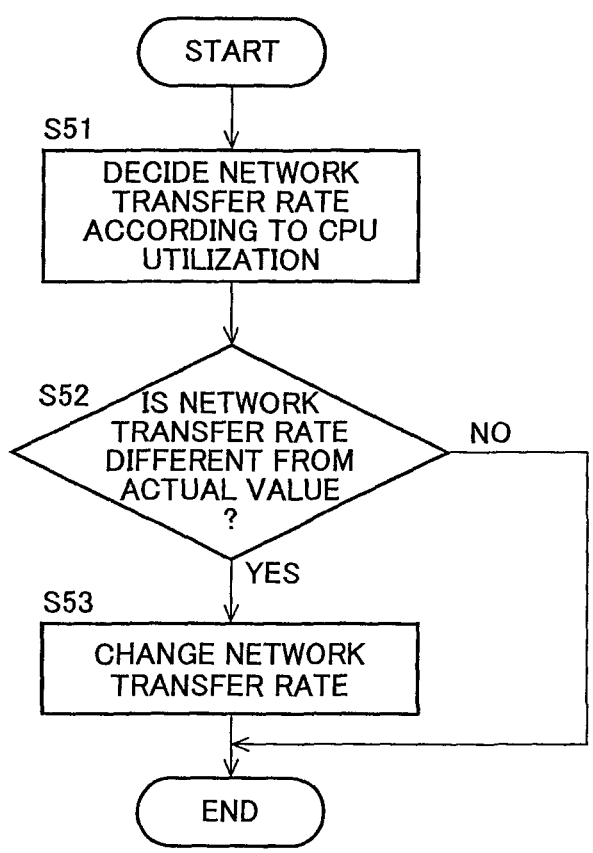
FIG. 12 is a flowchart for explaining an example of network load change processing at step S27 of FIG. 7.

FIG. 12 is a flowchart for explaining an example of network load change processing at step S27 of FIG. 7. First, the job execution control portion 104 decides the network transfer rate according to the CPU utilization in the case of restricting the operating condition with reference to the network transfer rate table (step S51), and determines whether or not the decided network transfer rate is different from the actual value (default value) (step S52). Then, in the case of determining that the network transfer rate is different from the actual value (in the case of YES), a change of the network transfer rate is instructed to the network control portion 108 (step S53). Further, at step S52, in the case of determining that the network transfer rate is the same as the actual value (in the case of NO), the process is then finished.

As described above, according to the present invention, jobs are sequentially registered by priority, and since the job is executed in order of priority by restricting the operating condition of the image forming apparatus so that CPU utilization associated with execution of the job does not exceed the value required for smooth operation of a UI, it is possible to operate the UI smoothly without temporarily stopping job processing even in the case of lack of processing ability of a CPU, thus making it possible to relieve user's stress.

The invention claimed is:

1. An image forming apparatus forming an image based on a job related to image formation, comprising:
    a CPU configured to control operation of the image forming apparatus according to an operating condition that is set to the image forming apparatus;
    a job management table configured to sequentially register jobs by priority; and
    a job execution control portion configured to:
        determine whether or not to permit execution of the job according to the sequence of jobs registered in the job management table;
        calculate, based on a job condition of the job intended for permission determination, a calculated percent of CPU utilization associated with execution of the job, wherein the calculated percent of CPU utilization associated with execution of the job is calculated by summing an actual percent of CPU utilization and an estimated percent of CPU utilization, the estimated percent of CPU utilization determined by at least one of:
            multiplying a default percent CPU utilization by a default latency time divided by a current processing latency time between pages of the job, wherein the default percent of CPU utilization is determined based on the job condition of the job; and
            multiplying the default percent of CPU utilization by a current pages processed per minute divided by a default pages processed per minute; and
        restricts the operating condition of the image forming apparatus when the calculated percent of CPU utilization exceeds a predetermined value, and permits execution of the job according to the restricted operating condition when the calculated percent of CPU utilization at the time of restricting the operating condition becomes the predetermined value or lower.

2. The image forming apparatus as defined in claim 1 further comprising a job priority table in which a type of a job is associated with priority of the job, wherein the job execution control portion sorts the registered jobs by priority for registering in the job management table based on the type of the registered jobs by referencing the job priority table.

3. The image forming apparatus as described in claim 1 further comprising a CPU utilization table of the registered jobs in which a job condition of each job is associated with a percent of CPU utilization used to execute each job, wherein the job execution control portion specifies, based on the job condition of the job intended for permission determination, the CPU utilization used to execute the job by referencing the CPU utilization table.

4. The image forming apparatus as described in claim 1, wherein restriction for the operating condition of the image forming apparatus is to delay a processing latency time between respective pages constituting the job intended for the permission determination.

5. The image forming apparatus as described in claim 1 further comprising a network transfer rate table in which the calculated percent of CPU utilization is associated with a network transfer rate, wherein the job execution control portion specifies, based on the calculated percent of CPU utilization associated with execution of the job, the network transfer rate corresponding to the calculated percent of CPU utilization with reference to the network transfer rate table, and when the specified network transfer rate is different from a default speed, changes the default speed to the specified network transfer rate.

* * * * *